Feb. 24, 1948. W. G. WEHR 2,436,625
CLUTCH
Original Filed April 21, 1944  5 Sheets-Sheet 1

INVENTOR.
BY WILLIAM G. WEHR
Kwis, Hudson, Boughton & Williams
ATTORNEYS

Feb. 24, 1948. W. G. WEHR 2,436,625
CLUTCH
Original Filed April 21, 1944 5 Sheets-Sheet 2

INVENTOR.
WILLIAM G. WEHR
BY
Kwis, Hudson, Boughton & Williams
ATTORNEYS

INVENTOR.
WILLIAM G. WEHR
BY
Kwis, Hudson, Boughton & Williams
ATTORNEYS

INVENTOR.
WILLIAM G. WEHR
BY
Kwis, Hudson, Boughton & Williams
ATTORNEYS

Patented Feb. 24, 1948

2,436,625

UNITED STATES PATENT OFFICE 2,436,625

CLUTCH

William G. Wehr, North Madison, Ohio, assignor to The Cleveland Crane & Engineering Company, Wickliffe, Ohio, a corporation of Ohio Original application April 21, 1944, Serial No. 532,078. Divided and this application December 29, 1945, Serial No. 638,245

3 Claims. (Cl. 192—22)

The present invention relates to machine tools and, more particularly, to power-operated, heavy duty shears and the like and to a friction clutch for use with such machines.

One of the principal objects of the invention is the provision of a novel and improved, power operated, heavy duty shears of the general type employed in shops engaged in fabricating metal plates and the like having a movable ram actuated by pitmans connected to a crankshaft, and means including a friction clutch for operatively connecting the crankshaft with a power actuator.

Another object of the invention is the provision of a novel and improved friction clutch particularly adapted for use with shears, bending brakes, presses and the like, which are repeatedly stopped at a predetermined point in their cycle of operation.

The invention resides in certain constructions and combinations and arrangements of parts, and further objects and advantages will be apparent to those skilled in the art to which it relates from the following description of the preferred embodiment described with reference to the accompanying drawings forming a part of this specification in which similar reference characters designate corresponding parts throughout the several views, and in which Fig. 1 is a front elevational view of a power operated, heavy duty shears embodying the present invention;

Figure 1:
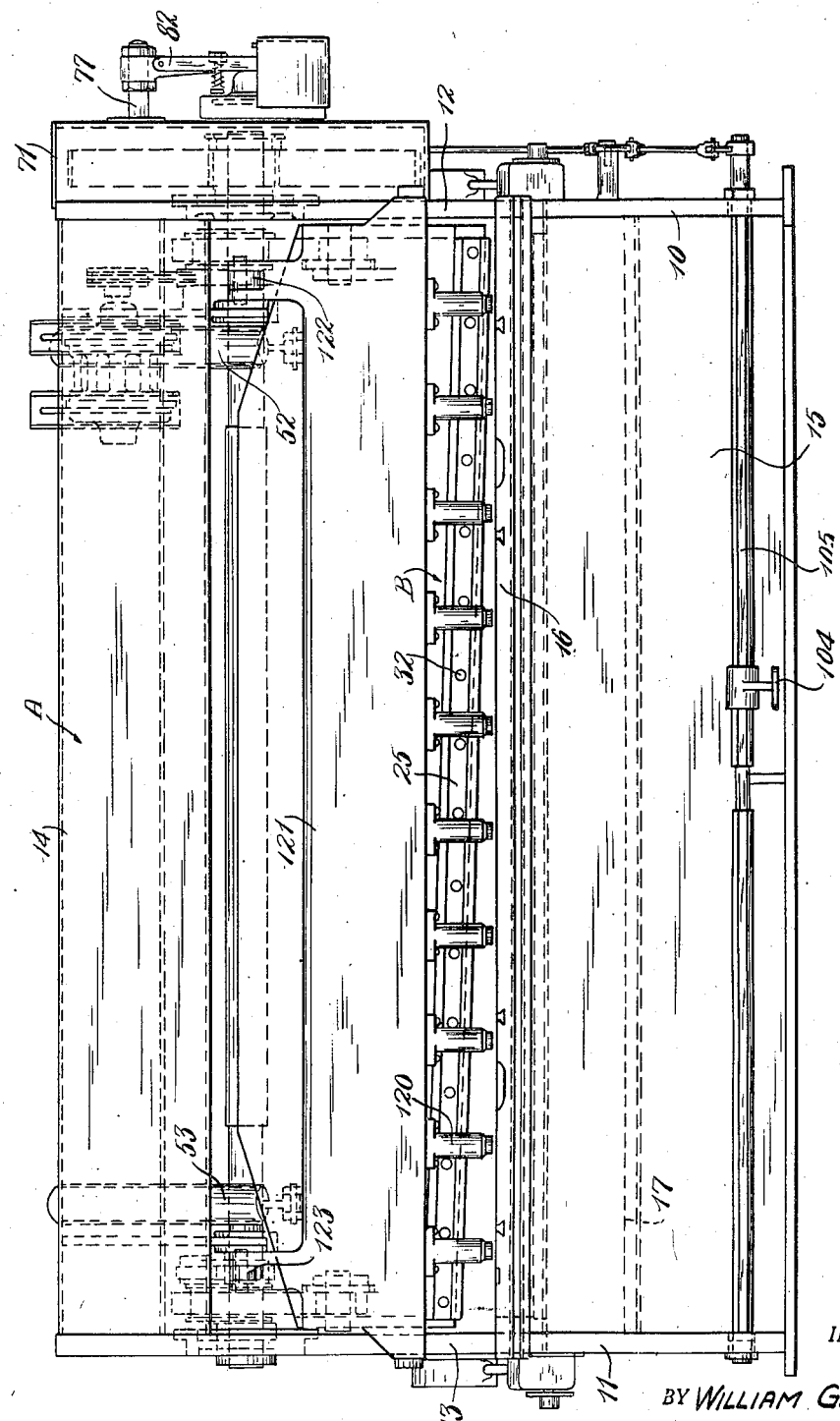
Figure 2:
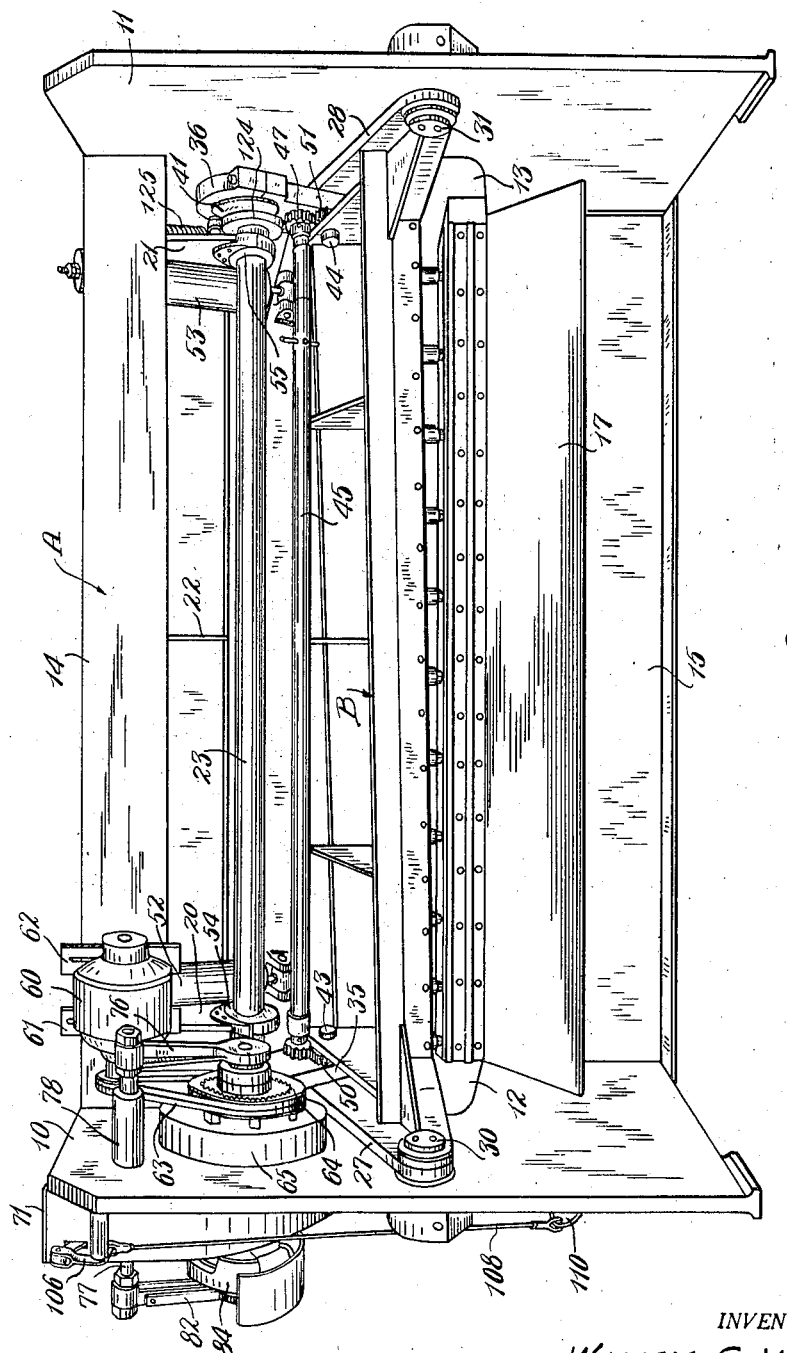
Fig. 2 is a rear view of the shears shown in Fig. 1.

This application is a division of my copending application Serial No. 532,078, filed April 21, 1944, now Patent No. 2,397,896, and only those parts of the shears shown and described in said application which are necessary to a complete understanding of the present invention are herein shown and described in detail. Reference to the aforesaid application is made for a complete showing and description of those parts of the shears not fully shown and described herein.

Referring to the drawings, the reference character A designates a frame comprising stress-resisting, plate-like end members or side housings 10, 11 having aligned openings 12, 13, respectively, in their front edges; a crown 14; and a bed comprising plate-like members 15, 16 and 17, the latter of which forms a scrap chute.

The vertical plate-like member 15 is located immediately to the rear of and welded to the horizontal plate-like member 16, which member in addition to reinforcing the upper edge of the member 15, forms a support or work table for the work. The upper member or crown 14 is generally box-shaped in cross-section and the opposite ends thereof are welded to the side members 10, 11 adjacent to their front upper edges. Web members 20, 21, 22 welded to the interior of the member 14 reinforce the same. The lower ends of the web members 20, 21 extend below the rear side of the member 14 and form a support for a crankshaft 23. The shearing operation is performed by a stationary shearing knife 24 located in the cut-out portion at the upper rear corner of the bed and a movable shearing knife 25 connected to the lower front edge of a movable ram or leaf, designated generally by the reference character B. The movable ram or upper blade B is of built-up construction and comprises a longitudinally extending, front plate 26 welded to rearwardly projecting end members 27, 28, the rear ends of which are rotatably connected to short, shaft-like members 30, 31 rotatable in suitable apertures in the side housings 10, 11, respectively, for pivotal movement about axes eccentric to the axes about which the end members 27, 28 are connected thereto.

Figure 3:
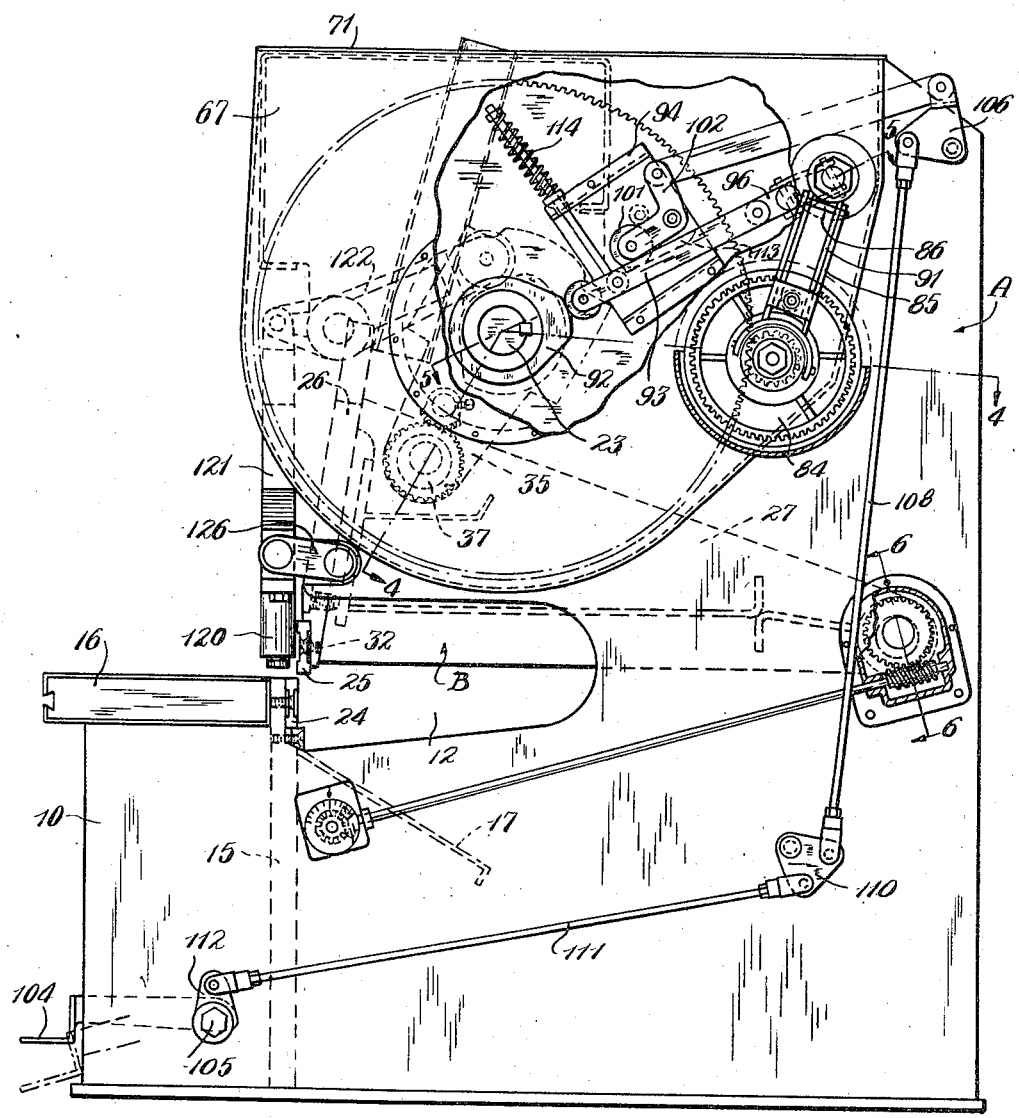
Fig. 3 is an end view of the shears shown in Fig. 1, looking from the right.

The front plate 26 of the blade B is inclined at a slight angle to the vertical, as shown in Fig. 3, to provide clearance between the ram or blade B and the stationary knife when the blade is moved in a downwardly direction. The lower front edge of the plate 26 is cut out to receive the shearing knife 25 which is held in position therein by a plurality of screws 32 projecting therethrough and threaded into suitably tapped apertures adjacent to the lower edge of the plate 26. The heads of the screws 32 are located in a groove in the front face of the shearing knife and are countersunk so as not to interfere with the operation of the device.

The front end of the ram or movable blade B is supported and the entire assembly adapted to be oscillated about the shafts 30, 31 by pitmans 35, 36 including eccentrics 37, only one of which is shown in the drawings. The upper ends of the pitmans are operatively connected to eccentrics 40, 41 keyed to the crankshaft 23 and the lower ends of the pitmans to short shafts 43, 44 fixed in opposite ends of the blade B. The construction is preferably such that the resultant of the shearing forces passes substantially through the shafts 43, 45, the pitmans or connecting rods 35, 36 and the eccentrics 40, 41.

As shown, eccentrics 37 which are rotatably supported in the lower ends of the pitmans and surround the shafts 43, 44 are adapted to be simultaneously rotated to adjust the blade relative to the pitmans by a shaft 45 rotatably supported in suitable apertures in the pitmans. Opposite ends of the shaft 45 are provided with small gears 46, 47 adjustably secured thereto, as by thumb screws, which gears are continuously in mesh with small gears 50, 51 formed integral with the eccentrics 37. Any suitable means may be provided for rotating the shaft 45. This adjustment provides means for converting the machine from through shears to splitting shears or vice versa. In the preferred embodiment shown, the weight of the movable blade assembly B is counterbalanced by adjustable compression springs, one at either end of the ram, located within the tubular members 52, 53 fixed to the crown member 14.

The crankshaft 23 is rotatably supported in bearings 54, 55 detachably bolted to the lower ends of the web members 20, 21 and by a bearing 56 where it projects through the side housing 10. The crankshaft is adapted to be driven by an electric motor 60 adjustably bolted to plates 61, 62 welded to the crown member 14. The rotor shaft of the motor 60 is connected by a flexible drive connection, designated generally as 63, to a wheel 64 fixed to a flywheel 65 rotatably supported on a shaft 66, which shaft is in turn rotatably supported in suitable bearings fixed to the side housing 10 and to a plate 67 spaced therefrom but connected thereto by an irregularly-shaped plate 68 interposed therebetween and the side housing 10. The plates just mentioned form an enclosure or compartment on the outside of the side housing 10 which houses mechanism including a pinion gear 69 keyed to the shaft 66 and in mesh with a large gear 70 keyed to the end of the crankshaft 23. The compartment formed by the members 10, 67 and 68 is closed by a removable cover 71 bolted to the top thereof. A removable member 72 on the plate 67 affords access to the end of the crankshaft 23.

Figure 4:
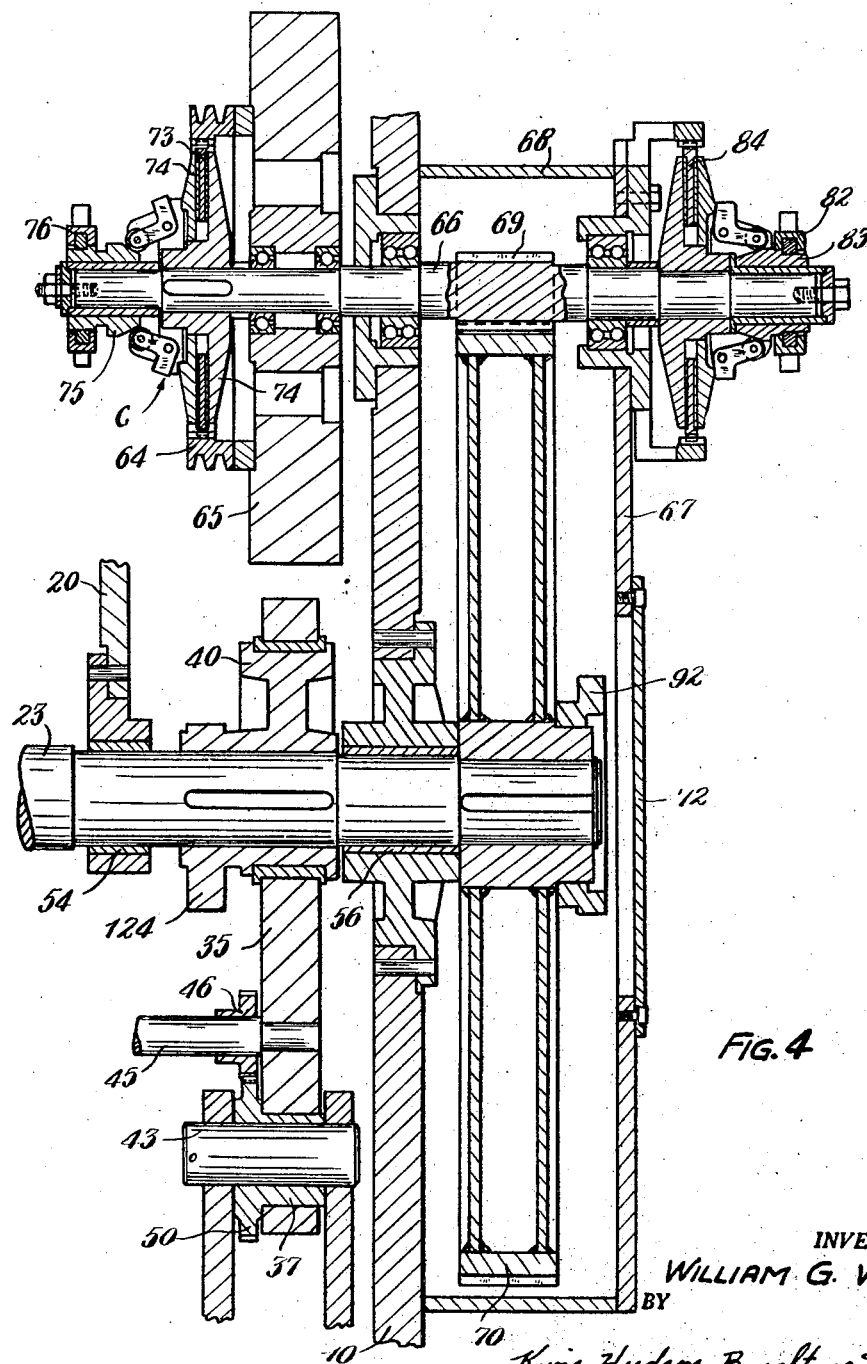
Fig. 4 is a sectional view approximately on the line 4—4 of Fig. 3.

The flywheel 65 is adapted to be connected with and disconnected from the shaft 66 by a friction disk clutch, designated generally by the reference character C. The driving member 73 of the clutch is adapted to be clamped between relatively movable driven members 74 by a clutch operating member 75 slidably supported on the left-hand end of the shaft 66, see Fig. 4, and adapted to be reciprocated therealong by a yoke member 76 fixed to the left-hand end of a rod 77, see Fig. 5. The rod 77 is slidably supported by a tubular member 78 fixed in a suitable aperture in the member 10 and by a disk-like member 79 fixed in a suitable aperture in the plate 67 and is continuously urged toward the right, as viewed in Fig. 5, that is, in a direction to engage the clutch C by a compression spring 80 surrounding the same and located within the tubular member 78. The left-hand end of the compression spring 80 engages the closed end of the tubular member 78 and the other end thereof engages a collar 81 detachably connected to the rod 77.

The opposite or right-hand end of the rod 77 is provided with a two-part yoke member 82, the lower end of which is connected to a brake operating member 83. The brake operating member 83 is similar to the clutch operating member 75 and the construction is such that when the clutch C is disengaged by movement of the rod 77 toward the left, as viewed in Fig. 5, a disk-type brake, designated generally as 84, is applied by the member 83.

Figure 5:
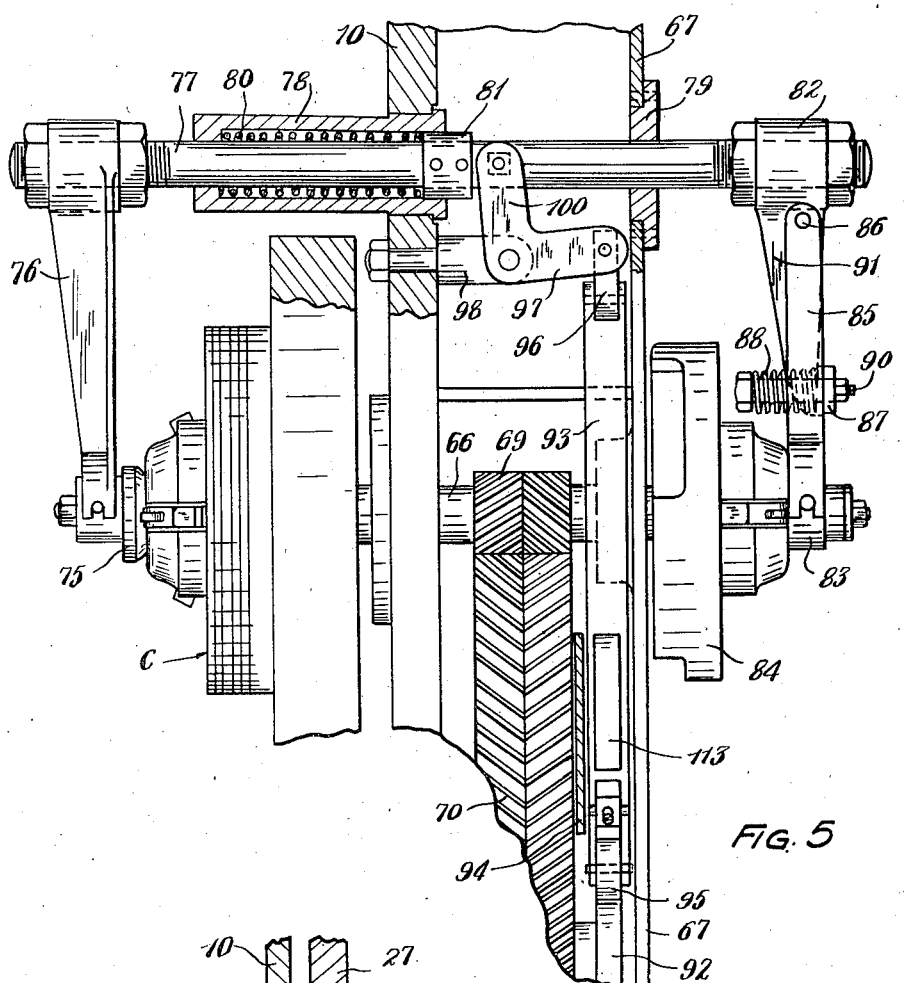
Fig. 5 is a sectional view approximately on the line 5—5 of Fig. 3.
Figure 6:
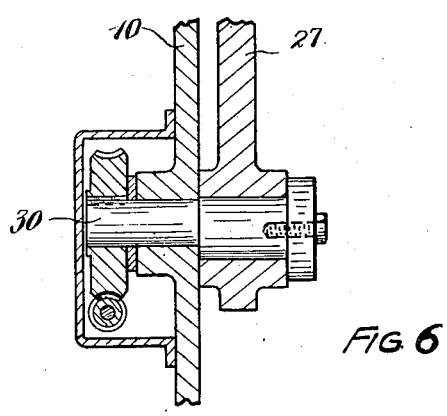
Fig. 6 is a sectional view, with portions in elevation, approximately on the line 6—6 of Fig. 3.

The construction of the two-part yoke member 82 is such to permit limited movement of the rod 77 after the brake 84 is applied. The particular construction employed also permits the force with which the brake is applied to be readily regulated. Referring particularly to Figs. 3 and 5, the lower part 85 of the yoke 82 is pivotally connected to the upper part by a pin 86. Rotation of the part 85 about its pivot 86 in a clockwise direction, as viewed in Fig. 5, is limited by a cross member 87 and the two parts are normally held in engaged position by a compression spring 88 surrounding a bolt 90 projecting through aligned apertures in the cross member 87 and in the lower end of the upper part of the yoke member. The compression spring 88 is interposed between the head of the bolt 90 and the lower end of the upper part 91 of the yoke member 82. The construction is such that continued movement of the rod 77 after the brake is applied causes a slight rotation of the member 85 about its pivot 86 against the action of the spring 88, which spring in turn controls the force with which the brake is applied. This force can be readily varied by changing the effective length of the bolt 90.

The rod 77 is adapted to be shifted toward the right, as viewed in Fig. 5, to release the brake 84 and engage the clutch C by a cam 92 fixed to the hub of the gear 70, which cam is adapted to reciprocate a bar 93 slidably supported between the plate 67 and a bracket 94 bolted thereto. The lower or left-hand end of the bar 93, as viewed in Fig. 3, is provided with a roller 95 which engages the cam 92 and the right-hand end thereof is pivotally connected to a member 96 for rotation about a horizontal axis. The member 96 is in turn pivotally connected to one arm of the bell crank lever 97 for movement about a more or less vertical axis. The bell crank lever 97 is pivotally connected to a bracket 98 fixed to the member 10 and the other arm 100 thereof is pivotally connected to the rod 77. The construction is such that reciprocation of the rod 93 produces linear movement of the rod 77 and vice versa.

Normally, the roller 95 on the lower end of the bar 93 rides on the high part of the cam 92 and maintains the rod 77 in its left-hand position, as viewed in Fig. 5, with the clutch 73 disengaged and the brake 84 applied. The roller 95 is adapted to be moved in a downward direction away from the high part of the cam 92 by a roller 101 carried by one arm of a bell crank lever 102 pivotally connected to the bracket 94, the other arm of which is pivotally connected to a link 103 operatively connected by a plurality of bell crank levers and links to a treadle 104 carried on a hexagonal shaft 105 extending along the front of the machine underneath the member 16 and adjacent to the floor. The treadle is slidable along the shaft 105 so that it can be moved to any convenient location along the front of the shears. As shown, the mechanism for connecting the link 103 with the shaft 105 comprises a bell crank lever 106 pivotally connected to the member 10 adjacent to the top thereof to which lever the link 103 is connected, a link 108 pivotally connected to the bell crank lever 106 and to a bell crank lever 110 connected to the end housing 10 near the floor, and a link 111 connected to the bell crank lever 110 and to a lever 112 fixed to the end of the shaft 105; however, any suitable alternative construction may be employed. The roller 101 engages within a groove 113 in the upper side of the bar 93 and the bar 93 is yieldably urged into engagement therewith by a compression spring 114 surrounding a rod 115 pivotally connected to the bar 93 and projecting through the upper side of the bracket 94. The compression spring 114 is interposed between the bracket 94 and an adjustable nut on the upper end of the rod 115.

The construction of the mechanism just described is such that when the treadle 104 is depressed, the bell crank lever 102 is rotated about its pivot in a counterclockwise direction, forcing the bar 93 downward until the roller 95 rides off the high part of the cam 92, whereupon the bar 93 and in turn the rod 77 are moved by the spring 80 in a direction to disengage the brake 84 and engage the clutch 73. The engagement of the clutch 73 causes the shaft 66 to rotate which in turn rotates the crankshaft 23, oscillating the movable blade B. The crankshaft is rotated in a counterclockwise direction, as viewed in Fig. 3, and immediately upon the high part of the cam 92 moving away from the roller 95, the bar 93 returns to its normal upper position under the action of the spring 114. As the crankshaft completes one revolution, the roller 95 travels up the high part of the cam, shifting the bar 93 and the rod 77 against the action of the spring 80 to a position where the clutch C is disengaged and the brake 84 engaged, thus one complete oscillation of the movable blade B is automatically effected each time the treadle 104 is depressed and immediately released.

The shears, as shown, are also preferably provided with a plurality of spring-loaded, hold-down devices 120 detachably connected to the lower edge of a hold-down plate 121, opposite ends of which are suspended from the forward arms of bell crank levers 122, 123 pivotally supported on short shafts carried by the plates 20, 21. The rear arms of the bell crank levers referred to are provided with rollers which engage suitable cams 124 formed integral with the eccentrics 40, 41. The bell crank levers 122, 123 are continuously urged in a direction to engage the rollers thereof with the cams 124 by suitable spring means 125. Opposite ends of the hold-down plate 121 are pivotally connected to the members 10, 11 by links 126 pivotally connected to the hold-down plate 121 and to the members 10, 11.

From the foregoing it will be apparent that the objects of the invention heretofore enumerated and others have been accomplished, and that there has been provided a novel and improved friction clutch particularly adapted for use with power-operated shears and the like which are repeatedly stopped at a predetermined point in their cycle of operation. While the preferred embodiment of the invention has been described in detail, the invention is not limited to the particular construction shown and it is my intention to hereby cover all adaptations, modifications and uses thereof which come within the practice of those skilled in the art to which the invention relates and within the scope of the appended claims.

Having thus described my invention, I claim:

1. In a metal working machine, the combination with a crankshaft rotatably supported in a frame of: means including a clutch for rotating the crankshaft; a member slidably and rotatably supported in the frame and operatively connected to said clutch for moving said clutch into disengaged position; a cam operated in timed relation with the rotation of said crankshaft and having a high point for moving said member in a direction to disengage said clutch; means for rotating said member to move the same free of the high point of said cam; and yieldable means for continuously urging said member into a position where it will be acted upon by said cam.

2. In a metal working machine, the combination with a crankshaft rotatably supported in a frame of: means including a clutch for rotating the crankshaft; a member slidably and rotatably supported in the frame and operatively connected to said clutch for moving said clutch into disengaged position; means for continuously urging said clutch into engaged position; a cam operated in timed relation with the rotation of said crankshaft and having a high point for moving said member in a direction to disengage said clutch; means for rotating said member to move the same free of the high point of said cam; and yieldable means for continuously urging said member into a position where it will be acted upon by said cam.

3. In a metal working machine, the combination with a crankshaft rotatably supported in a frame of: means including a friction clutch for rotating the crankshaft; a member slidably and rotatably supported in the frame and operatively connected to said clutch for moving said clutch into disengaged position; means for continuously urging said clutch into engaged position; a cam operated in timed relation with the rotation of said crankshaft and having a high point for moving said member in a direction to disengage said clutch; means for rotating said member to move the same free of the high point of said cam; and yieldable means for continuously urging said member into a position where it will be acted upon by said cam.

WILLIAM G. WEHR.

REFERENCES CITED

The following references are of record in the file of this patent:

UNITED STATES PATENTS

| Number | Name | Date |
| --- | --- | --- |
| 823,085 | Taylor | June 12, 1906 |
| 1,322,534 | Candee | Nov. 25, 1919 |
| 1,532,116 | Batchelder | Apr. 7, 1925 |